United States Patent [19]
Watanabe et al.

[11] Patent Number: 5,729,738
[45] Date of Patent: Mar. 17, 1998

[54] DATA MANAGEMENT SYSTEM UTILIZING BEHAVIORAL OBJECTS WITH LINKING RELATIONSHIPS

[75] Inventors: Yoshiki Watanabe; Hiroshi Hayata, both of Kanagawa, Japan

[73] Assignee: Fuji Xerox Co., Ltd., Tokyo, Japan

[21] Appl. No.: 478,761

[22] Filed: Jun. 7, 1995

[30] Foreign Application Priority Data

Jun. 29, 1994 [JP] Japan .................................. 6-170083

[51] Int. Cl.$^6$ .................................................. G06F 17/30
[52] U.S. Cl. ............................................ 395/614; 395/800
[58] Field of Search .................................. 395/600, 700, 395/614, 800, 612, 608

[56] References Cited

U.S. PATENT DOCUMENTS

| | | | |
|---|---|---|---|
| 5,050,074 | 9/1991 | Marca | 395/608 |
| 5,175,848 | 12/1992 | Dysart et al. | 395/600 |
| 5,241,673 | 8/1993 | Schelvis | 395/614 |
| 5,291,593 | 3/1994 | Abraham et al. | 395/614 |
| 5,303,379 | 4/1994 | Khoyi et al. | 395/700 |
| 5,317,727 | 5/1994 | Tsuchida et al. | 395/600 |
| 5,369,778 | 11/1994 | San Soucie et al. | 395/800 |
| 5,437,025 | 7/1995 | Bale et al. | 395/614 |
| 5,504,892 | 4/1996 | Atsatt et al. | 395/614 |
| 5,511,196 | 4/1996 | Shackleford et al. | 395/700 |
| 5,542,078 | 7/1996 | Martel et al. | 395/612 |
| 5,544,359 | 8/1996 | Tada et al. | 395/600 |
| 5,557,793 | 9/1996 | Koerber | 395/614 |

OTHER PUBLICATIONS

Hiroki Akama et al; "Application of Object–Oriented Techniques to Design RDBMS", NTT Network Information Systems Laboratories pp. 1–10 (1993).

D.S. Batory et al.; "Genesis: An Extensible Database Management System", IEEE Transactions on Software Engineering, vol. 14, No. 11, pp.1711–1730, Nov. 1988.

M. Carey et al; "The EXODUS Extensible DBMS Project: An Overview", Relational Extensions and Extensible Databases, pp. 474–499 no date.

D.L. Wells et al; "Architecture of an Open Object–Oriented Database Management System", Computer, pp. 74–81, Oct. 1992.

R. Yaseen et al; "An Extensible Kernal Object Management System", OOPSLA'91 pp. 247–263, 1991.

*Primary Examiner*—Thomas G. Black
*Assistant Examiner*—Charles L. Rones
*Attorney, Agent, or Firm*—Finnegan, Henderson, Farabow, Garrett & Dunner, L.L.P.

[57] ABSTRACT

A data management system for managing data stored in a storage device is equipped with a behavioral storage unit for storing behavioral objects in which processing procedures on data management are defined, an entity storage unit for storing entity objects each of which refers to each of the behavioral objects, an object link management unit for setting reference relationship between the entity objects and the behavioral objects on the basis of a setting instruction and managing the set reference relationship, and a system executing unit for executing a processing procedure defined in a behavioral object to be referred to by an entity object which is instructed to be executed.

4 Claims, 7 Drawing Sheets

DATA MANAGEMENT SYSTEM UTILIZING BEHAVIORAL OBJECTS WITH LINKING RELATIONSHIPS

BACKGROUND OF THE INVENTION

1. Field of the Invention

The present invention relates to a data management system, and particularly to a data management system for managing data which are stored in a main storage device or auxiliary storage device.

2. Description of Related Art

A data management system such as a database or the like is required to perform data input/output operation or a general data managing operation with high efficiency in accordance with each of plural different application programs or in accordance with its using status (environment). In order to satisfy this requirement, various proposals have been made as disclosed in Unexamined Japanese Patent Publication Hei-3-196345/(1991), Unexamined Japanese Patent Publication Hei-3-206534/(1991) and Unexamined Japanese Patent Publication Hei-4-112242 (1992).

Hei-3-196345 discloses a data input/output system in a computer system. This data input/output system is designed so that it can be selectively determined whether a buffer cache should be used or not for a data input/output operation between a user buffer on a main storage device and an auxiliary storage device. That is, the data input/output system is designed so that a file management means is equipped with an input/output means using a buffer cache, an input/output means using no buffer cache and a selection means for selecting a transmission bus used for data input/output, and one of a transmission bus using a buffer cache and a transmission bus using no buffer cache is selected in accordance with the amount of data to be input or output.

Hei-3-206534 discloses a data management system for performing data management for plural users as targets in accordance with each user in a calculation system. In the data management system, plural pieces of environmental definition information on data to be managed (data construction definition information, data history definition information or the like) are provided, and every time a user or a work is altered, a suitable piece of environmental definition information is selected from the plural pieces of environmental definition information in accordance with variation of the user or work. For example, plural pieces of data construction definition information are stored and managed, and the optimum piece of data construction definition information which meets a data using status (environment) is selected from the plural pieces of data construction definition information, so that a logical data architecture is constructed on the basis of the data construction definition information by a data constructing mechanism, and it is supplied to a user.

Hei-4-112242 discloses a database processing device for accessing a database or the like. This database processing device, which is designed to access a database in accordance with definition information of the database, is equipped with the following means and mechanism with respect to the alteration of the definition information of the database: a definition alteration managing means for managing, every definition element, definition information of old version and new version before established, an access selecting means for selecting, in response to a request of access, which definition information of new or old version is used by the access, and a mechanism for replacing the old-version definition information with the new-version definition information when all necessary alteration processing for the definition information is established. With this construction, the definition information of the database can be readily altered with no problem.

However, the conventional arts as described above have the following problems.

In the data input/output system of Hei-3-196345, only a mechanism for selecting one of a transmission route using a buffer cache and a transmission route using no buffer cash as a transmission route for data input/output, is merely provided to the file managing means. Therefore, it is impossible to define or specify a data input/output manner at an application program side.

In both the data management system of Hei-3-206534 and the database processing device of Hei-4-112242, it is possible to define some pieces of data definition information and selectively specify one of the defined data definition information at an application program side. However, according to these prior arts, the alteration at the application program side is limited to alteration of the data definition information, that is, it is applicable to only a data storage structure. Therefore, it cannot be applied to alteration of processing which needs definition by procedure program for cache management or the like.

In general, in a data management system (containing database processing system) for managing data on the basis of an object-oriented programming, an object is stored as a group of data and a processing content (operation program) thereof in an object storage unit. The content of the object in the object storage unit is fixed, so that it cannot be altered in accordance with an application program and also it cannot be dynamically altered in accordance with a status of the application program during an operation of the system. Accordingly, for the conventional data management system, it has been increasingly required in order to improve a data processing efficiency that the alteration as described above can be altered at the application program side, and it has been also required that the construction and operation of the system can be dynamically altered.

SUMMARY OF THE INVENTION

An object of the present invention is to provide a data management system in which a data processing procedure suitable for an application program can be defined and selected by the application program itself, and in which the construction of the system or the operation of the system can be altered in accordance with a status during execution of the application program to perform the data processing efficiently.

In order to attain the above object, according to a first aspect of the present invention, a data management system for managing data stored in a storage device (data storage device 13 in FIG. 1) such as a main storage device, an auxiliary storage device or the like, includes first storing means (behavioral object storage unit 15) for storing behavioral objects in which processing procedures (read/write, record arrangement, lock shown in FIGS. 2 and 6) on data management are defined, second storing means (entity-object storage unit 14) for storing entity objects (page, transaction, in FIGS. 2 and 6) each of which is linked to a behavioral object for reference, object link managing means (object link managing unit 16) for setting the reference relationship between the entity-objects and the behavioral objects on the basis of a setting instruction to manage the set reference relationship, and executing means (system executing unit 17) for executing the processing procedure defined in a behavioral object to be referred to by an entity object which is instructed to be executed.

In the first aspect of the present invention, the behavioral object in which the processing procedure on the data management is defined is stored in the first storing means while the entity object to refer to the behavioral object is stored in the second storing means, whereby the entity object (a portion which is called as "object (data)") and the behavioral object (a content portion which defines an operation) are stored and managed separately from each other. The object link managing means serves to set and manage references from the entity objects to the behavioral objects to hold the reference relationship between the entity objects and the behavioral objects. The object link management means serves to set (the term "set" contains "reset" in a sense of "alteration") the reference from the entity object to the behavioral object on the basis of the setting instruction which is given from the external.

In a second aspect of the present invention, the setting instruction is preferably supplied from an application program (12) in the data management system as described above.

According to the second aspect of the present invention, the setting instruction is supplied from the application program. Therefore, the application program itself can define and select a data processing procedure which is suitable for itself. Furthermore, the construction of the system or the operation of the system can be dynamically altered in accordance with a status during execution of the application program to perform efficient data processing. When receiving an instruction of execution on a specific entity object, the executing means checks the reference relationship managed by the object link managing means to access a behavioral object which the entity object concerned refers to, and executes a processing procedure which is defined by the behavioral object to process data stored in the main storage device, the auxiliary storage device or the like.

The entity objects and the behavioral objects are not limited to objects in an object-oriented language. In place of selection of a behavior object by an entity object on the basis of the reference relationship therebetween, the program corresponding to the behavioral object may be selected through data (having reference function) corresponding to the entity object on the basis of an instruction.

DETAILED DESCRIPTION OF THE PREFERRED EMBODIMENT

A preferred embodiment according to the present invention will be described hereunder with reference to the accompanying drawings.

Figure 1:
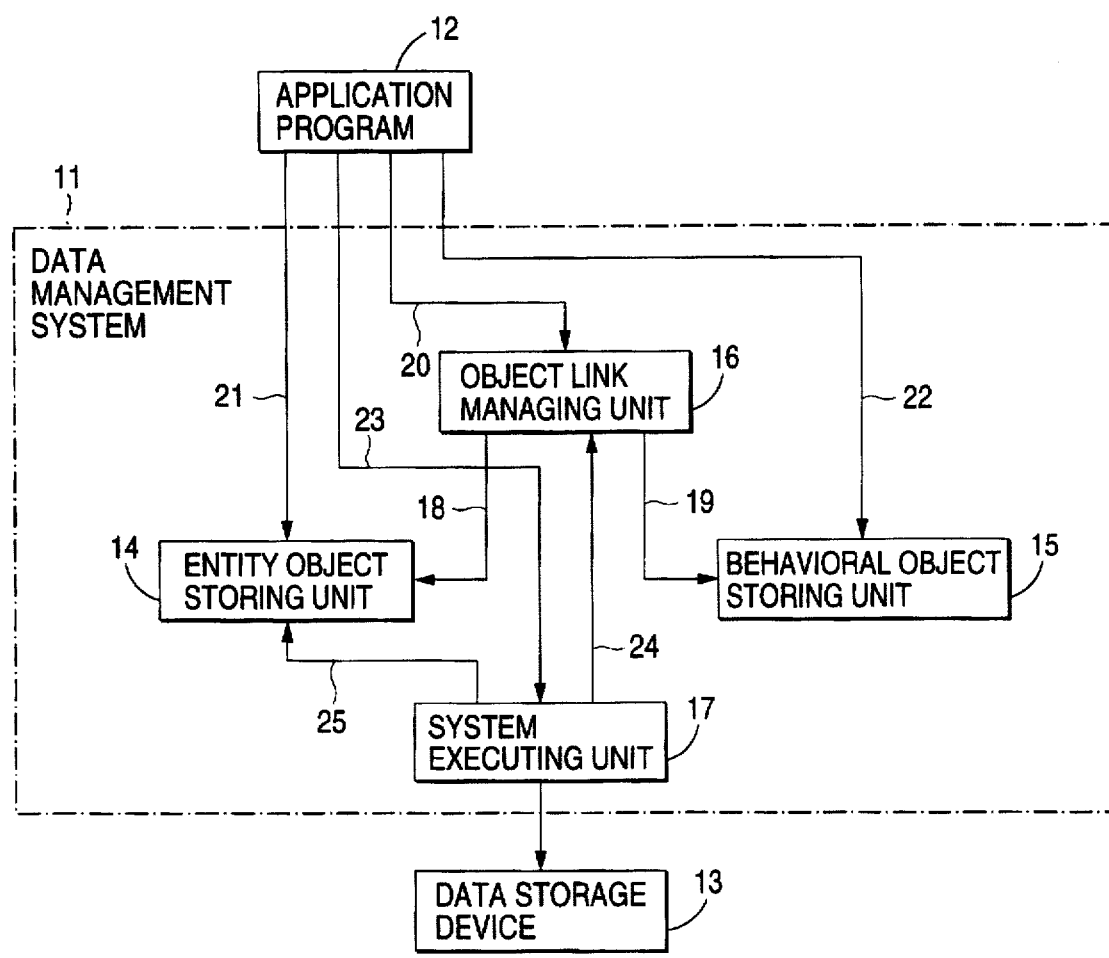
FIG. 1 is a functional block diagram showing a first embodiment of a data management system according to the present invention.

FIG. 1 is a functional block diagram showing an embodiment of a data management system according to the present invention.

The data management system of this embodiment is a system based on an object-oriented programming. In this object-oriented type data management system, an operation itself is contained in an object (data), and when a message is given, the message itself draws out an operation to execute processing. The "operation" is also called a "rule", "function", "processing content" or "processing procedure", and the term "operation" is representatively used in the following description.

A data management system 11 shown in FIG. 1 has a function of processing and managing data associated with an application program 12 upon reception of various instructions (messages) from the application program 12 when the application program 12 needs to process data stored in a data storage device 13. In FIG. 1, only one application program is shown to simplify the description, however, the number of application programs is not limited to one. Actually, plural different application programs are provided. The data management system 11 suitably receives from the respective application programs various instructions on data processing and management on data which are associated with the respective application programs.

The data storage device 13 may be a main storage device or an auxiliary storage device. When the data storage device 13 is an auxiliary storage device, the data management system 11 as described above corresponds to a database management system.

The data management system 11 is equipped with an entity object storing unit (second storing unit) 14 and a behavioral object storing unit (first storing unit) 15. The entity object storing unit 14 is used to store entity objects which are necessary to construct the data management system, and variables (rewritable storing area) for holding a reference from an entity object to the corresponding behavioral object. The number of the entity objects which are stored in the entity object storing unit 14 is not limited to a specific one, and any number of entity objects may be provided. The term "entity object" means a portion (object portion) which is called as "object (data)" in an object-oriented programming, and it is an element which is necessary to construct a system for data management. The entity object may contain a page, a transaction, a record, a file, etc. The entity object of this embodiment is provided, inside or outside thereof, with an area for individually holding the reference to behavioral objects as described later. The behavioral object storing unit 15 is used to store behavioral objects. The term "behavioral object" means a content (operation portion) in which an operation for an entity object is defined, and it corresponds to an operation in the object-oriented programming. The behavioral object may contain read/write, record arrangement, lock, etc. In each behavioral object stored in the behavioral object storing unit 15, the content of an operation is defined in the form of a program (which is hereinafter referred to as "method").

In a conventional object-oriented type data management system, the entity object (object portion) and the behavioral object (operation portion) have been fixedly linked to each other from the first, and thus these objects are formed into a single integral constituent element. On the other hand, in the object-oriented type data management system of this embodiment, the object portion (entity object) and the operation portion (behavioral object) have been separated from each other from the first, and thus these objects are separately treated as independent constituent elements. It is possible in a logical sense that an object which has formed one constituent element in the prior art is actually separated into an entity object and a behavioral object. Those elements which are to be provided as entity objects in the entity object storing unit 14 and as behavioral objects in the behavioral object storing unit 15 are suitably determined in accordance with a system which is to be constructed.

For the entity object and the behavioral object which are treated separately from and independently of each other, as described later, any necessary relationship is established between these objects under a predetermined restriction by an object link managing unit 16 on the basis of an instruction which is supplied from the application program 12 or the like. The term "relationship" means the relation based on references directing from entity objects to behavioral objects, and it is hereinafter referred to as "reference relationship". That is, the reference relationship is defined as the whole reference system for various references directing from the entity objects to the behavioral objects.

The internal construction of each of the entity object storing unit 14 and the behavioral object storing unit 15, and the reference relationship therebetween will be described later in detail in comparison with the construction of a conventional object storing unit.

The data management system 11 includes the object link managing unit 16 as described above and a system executing unit 17. The object link managing unit 16 has a function of setting (or altering) "object link" to hold and manage the reference (link) relationship between entity objects and behavioral objects. The term "object link" means the relation based on a reference directing from an entity object stored in the entity object storing unit 14 to its relational behavioral object stored in the behavioral object storing unit 15. The reference relationship is set on the basis of a setting instruction from the application program 12 or the system executing unit 17 by the object link managing unit 16.

As shown in FIG. 1, the object link managing unit 16 sets and holds the reference relationship on the basis of instructions 18 and 19 which are supplied to the entity object storing unit 14 and the behavioral object storing unit 15, respectively. The internal construction of the object link managing unit 16 will be described later in detail in association with its operation. On the basis of an instruction from the application program 12, the system executing unit 17 interprets an object link which is set in the object link managing unit 16, and executes an operation defined by a behavioral object to which an entity object stored in the entity object storing unit 14 is linked for reference (i.e., to which the entity object refers) through the object link to start a method for the entity object.

As shown in FIG. 1, various instructions 20, 21, 22 and 23 are supplied from the application program 12 to the respective parts of the data management system 11. The instruction 20 to the object link managing unit 16 is an instruction of setting reference relationship (setting references) or altering reference relationship (alter references). The instruction 21 to the entity object storing unit 13 is an instruction of allowing the application program 12 to make a direct reference to entity objects for check or alteration of the content of the entity objects. The instruction 22 to the behavioral object storing unit 14 is an instruction of allowing the application program 12 to make a direct reference to behavioral objects for check of the content of the behavioral objects and to take out them or alter the content thereof when a new behavioral object is registered or the like. For example, when a behavioral object to which an entity object refers (i.e., an entity object is linked) is altered, in some cases the application program 12 takes out the behavioral object to submit it to the object link managing unit 16. The instruction 23 to the system executing unit 21 is an instruction of allowing the system executing unit 21 to process data stored in the data storage device 13.

An instruction 24 supplied from the system executing unit 17 to the object link managing unit 16 is an instruction of setting the reference relationship as described above and altering the set reference relationship. An instruction 25 which is supplied from the system executing unit 17 to the entity object storing unit 25 is an instruction of specifying a behavioral object to which a specified entity object refers to start the method of the specified behavioral object when the system executing unit 21 receives the instruction 23 on data processing from the application program 12.

Figure 2:
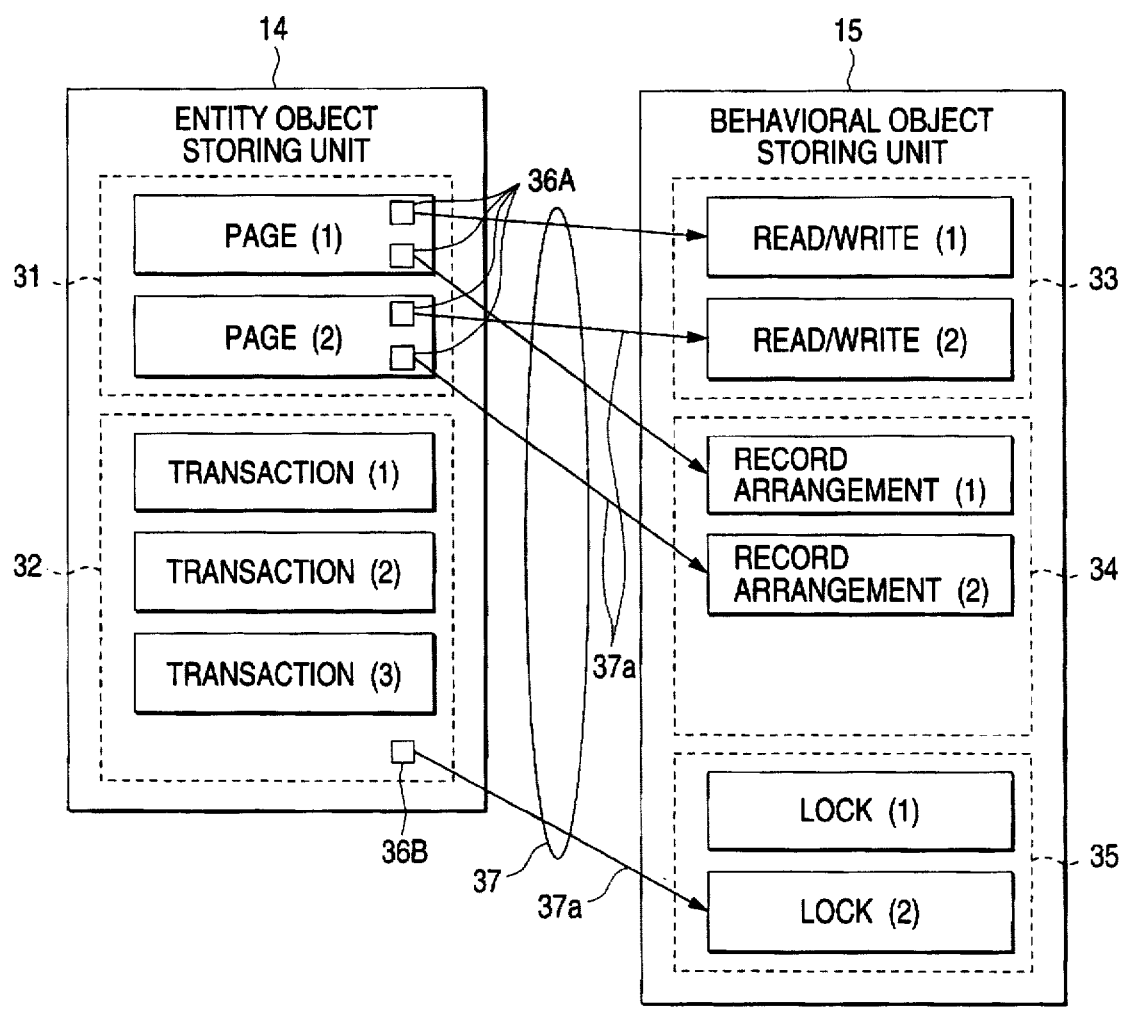
FIG. 2 is a diagram showing an embodiment of an entity object storage unit and a behavioral object storage unit.

FIG. 2 shows an example of the internal construction each of the entity object storing unit 14 and the behavioral object storing unit 15, and an example of the reference relationship between the entity objects stored in the entity object storing unit 14 and the behavioral objects stored in the behavioral object storing unit 15.

In FIG. 2, with respect to the entity object storing unit 14, a page (1) and a page (2) are stored as entity objects in a page class 31, and a transaction (1), a transaction (2) and a transaction (3) are stored as entity objects in a transaction class 32. With respect to the behavioral object storing unit 15, a read/write (1) and a read/write (2) are stored as behavioral objects in a read/write class 33, a record arrangement (1) and a record arrangement (2) are stored as behavioral objects in a record arrangement class 34, and a lock (1) and a lock (2) are stored as behavioral objects in a lock class 35. The discrimination of the same type of objects with the numbers (1), (2), . . . means that these same type of objects are different contents.

In addition to the above types, a record or a file may be stored as an entity object. Furthermore, security check, obstruction restoration, management of an operation history, etc. may be listed as operations on the behavioral object.

In the above description, the term "page" means a minimum unit which is communicated between a main storage device (actual storage device) and an auxiliary storage device (virtual storage device) in a virtual storage system. Furthermore, the term "transaction" is a data processing unit in the data management system 11, and it means one assembly in a read/write operation of page unit to the data storage device 13. In an actual operation, allotment of a work (role) is set between the "page" and the "transaction". The detailed content of the work allotment will be described later together with the description of the operation of the data management system.

The "read/write" in the read/write class 33 of the behavioral object is provided in correspondence to a page, and it means an operation of reading or writing the content of the page from and into the data storage device 13. For operations of the same type (class), the respective behavioral objects can defines different operation contents. For example, in the read/write class 33 are provided two behavioral objects having different operation contents of the read/write (1) and the read/write (2). In this case, the read/write (1) is an operation using cache memory, and the read/write (2) is an operation using cache memory. It is also satisfied for the other behavioral objects that a different operation content can be defined for the same class operation in accordance with each behavioral object.

The "record arrangement" is a behavioral object which is provided in correspondence to a page. For example, the record arrangement (1) is an operation of successively arranging records of fixed length, and the record arrangement (2) is an operation of successively arranging records of variable length. The "lock" is a behavioral object which is provided in correspondence with a transaction, and it performs a lock control so that a page read/write operation on a page can be processed at a time. For example, the lock (1) is a two-phase lock, and the lock (2) is a time stamp lock.

Each behavioral object is provided for each limited specific entity object. In this embodiment, the read/write (1) and (2) and the record arrangement (1) and (2) are provided as behavioral objects for the page (1) and (2), and the lock (1) and (2) are provided as behavioral objects for the transaction (1) to (3). Accordingly, the reference from the page (1), (2) to the read/write and the record arrangement is set, whereas no reference is set from the page (1), (2) to the lock. Furthermore, the reference from the transaction (1) to (3) to the lock is set, whereas no reference is set from the transaction (1) to (3) to the read/write and the record arrangement.

Each page and each transaction which serve as entity objects are provided with storage areas 36A and 36B so that the reference to behavioral objects is allowed if occasion demands. The storage area 36A is provided inside of the entity object, and the storage area 36B is provided outside of the entity object (however, in the class). In each of the storage areas 36A and 36B is set up a pointer for setting relation (a reference) which directs from each entity object stored in the entity object storing unit 14 to a corresponding behavioral object stored in the behavioral object storing unit 15. The content of each of the storage areas 36A and 36B is rewritable, and it is grasped as a variable for holding the reference to the behavioral object. The storage area 36B which is commonly provided outside of each transaction is grasped as a global variable.

Each of the pages (1) and (2) contains therein two storage areas 36A. One storage area at the upper side of the page (1) refers to the read/write (1) while the other storage area at the lower side of the page (1) refers to the record arrangement (1). On the basis of this reference relationship, the page (1) performs a read/write operation using cache memory to arrange records of fixed length. In addition, one storage area at the upper side of the page (2) refers to the red/write (2) while the other storage area at the lower side thereof refers to the record arrangement (2). On the basis of this reference relationship, the page (2) performs a read/write operation using no cache memory, and arranges records of variable length.

In this embodiment, the transactions (1) to (3) have no storage area therein, however, they have a common storage area 36B at the outside thereof. The common storage area 36B refers to the lock (1). Alternately, like the page, a storage area may be secured inside of each transaction if necessary.

Each of the references as described above is indicated by arrows 37a in FIG. 2, and it is set in a direction from each entity object to its corresponding behavioral object. The whole relationship system (i.e., the reference relationship) 37 which contains all the references indicated by the respective arrows 37a) is just the management content which is formed on the basis of the above instructions 18 and 19 in the object link managing unit 16.

Figure 7:
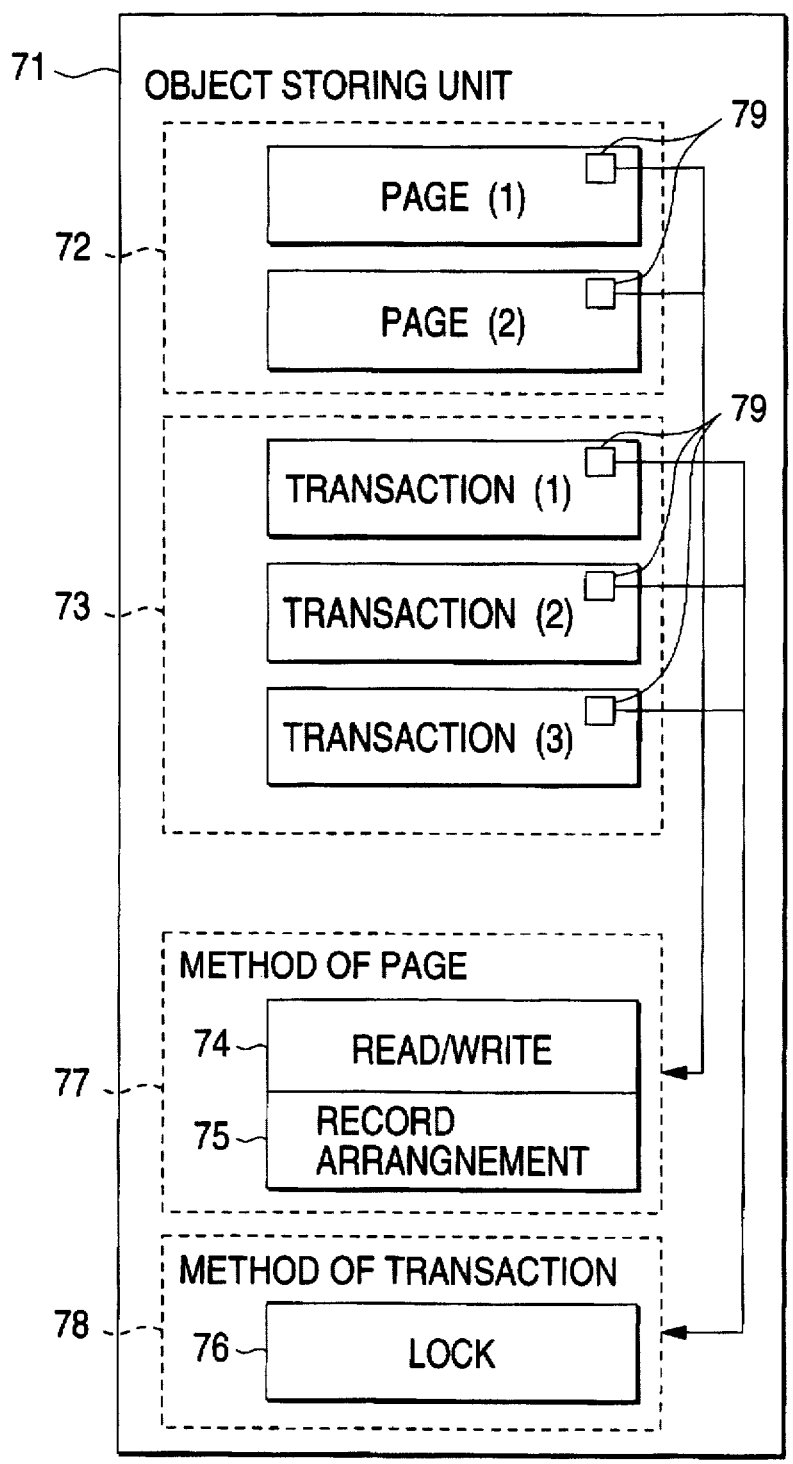
FIG. 7 is a diagram showing a conventional object storage unit.

Here, the construction of a conventional data management system based on the object-oriented programming will be described with reference to FIG. 7 to compare the construction of the conventional system and the construction of the system of this embodiment shown in FIG. 2 and describe the difference in construction and operation therebetween.

In the conventional data management system, an object storing unit 71 is formed as a single constituent element, and pages (1) and (2) and transactions (1) to (3) which constitute objects are stored in the object storing unit 71 while being assembled every cluster 72 (73). The pages (1), (2) and the transactions (1) to (3) shown in FIG. 7 are substantially identical to the corresponding pages and transactions as described above in FIG. 2, respectively. In addition, methods (operation programs) which are associated with the respective objects, that is, a read/write 74, a record arrangement 75 and a lock 76 are further stored in the object storing unit 71 while being logically assembled in the form of a table in accordance with each class of the objects. For example, the read/write 74 and the record arrangement 75 are stored in a page method 77, and the lock 76 is stored in a transaction method 78. A relation (reference) between each object and each table therefor is set (established) with a pointer. The pointer is set in a storage area 79 which is provided inside of each object. The pages (1) and (2) are related to the page method 77 by the pointers of the storage areas 79 thereof, and the transactions (1) to (3) are related to the transaction method 78 by the pointers of the storage areas 79 thereof.

With respect to execution of the conventional data management system, when the start of a method is instructed to an object by the application program, the system executing unit finds out the method corresponding to the specified object on the basis of the link relation between objects and methods which is set in the object storing unit 71, and then executes the method concerned.

Each pointer which is set in the storage area 79 of each object is automatically set on the basis of an execution environment of a program at the time when each object is generated. The link relation based on each pointer set in the storage area 79 is fixedly set, and thus it cannot be altered afterwards. Particularly, it is impossible that the link relation between the pointer and the table is freely altered on the basis of an instruction from the application program.

Unlike the conventional data management system as described above with reference to FIG. 7, with respect to the construction of the object storing unit 71 in the data management system of this embodiment, each object which comprises an entity object and a method in the prior art is divided into two objects so that the conventional object portion is set as "entity object" and the conventional method portion is set as "behavioral object", and the storing unit 14 for entity objects and the storing unit 15 for behavioral objects are separately provided to store these objects, whereby each entity object and each behavioral object are independently managed in the respective storing units. Furthermore, the relationship (reference relationship) between the entity objects and the behavioral objects can be freely set by the pointer.

With the construction of the data management system of this embodiment, the entity object and the behavioral object, that is, the operation content can be provided in a broader range. Furthermore, the range of combination between the entity object and its operation and the degree of freedom of the combination can be improved. In addition, on the basis of an instruction from the application program 12 or system executing unit 17, the reference relationship between objects (entity objects) and their operation contents (behavioral objects) can be set at any time if occasion demands, or the reference relationship which has been already established can be freely altered, or additive registration of operational contents can be performed.

Next, the operation on the data management system 11 as described above will be described. This operation includes the following two operations: a first operation for data processing when an instruction on data processing is received from the application program, and a second operation of setting a reference (or altering the reference) by the object link managing unit 16 on the basis of a setting instruction from the application program 12 (or system executing unit 17).

Figure 3:
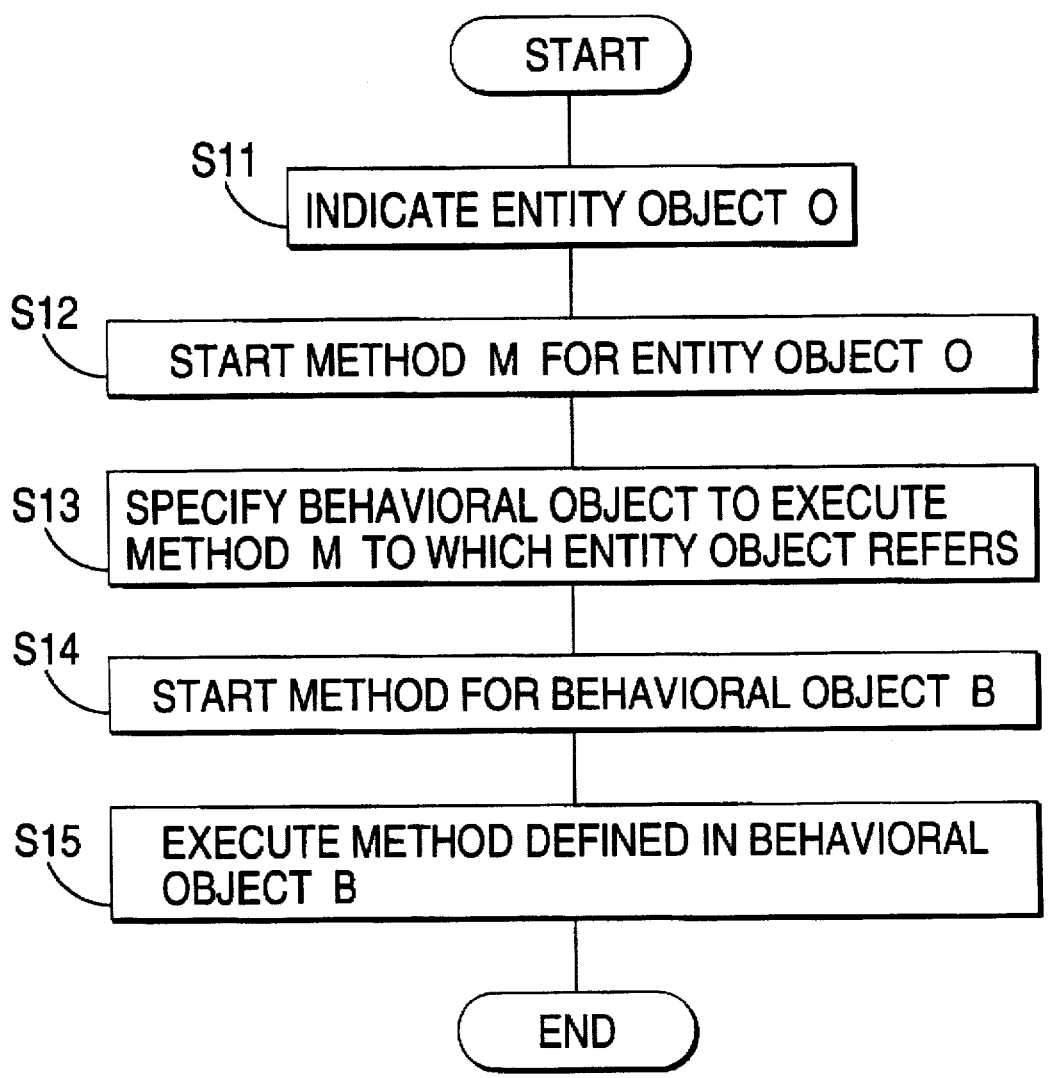
FIG. 3 is a flowchart for a method starting process for an entity object.

The first operation, that is, the processing operation to start a method for an entity object O will be described according to the flowchart of FIG. 3. The entity object O represents any entity object which is generalized, however, the following description will be made particularly when the entity object O is the page (2).

It is now assumed that the application program 12 performs, through the data management system 11, the record arrangement of a page managed by the page (2) for data which are stored in the data storage device 13. The application program 12 first supplies the instruction 23 to the system executing unit 17 to indicate an entity object O to be subjected to processing, that is, the page (2) (step S11). Thereafter, a method (referred to as "M") of the specified entity object O is instructed to start (step S12). The method M is an operation of performing the record arrangement for the page which is managed by the page (2). The system executing unit 17 outputs the instruction 25 to indicate a behavioral object B which is to be referred to on the basis of the specified page (2) (step S13). That is, the behavioral object B for executing the method M is specified while referring to the management content of the object link managing unit 16 for managing the reference relationship between the entity objects and the behavioral objects. Now, the entity object O is the page (2), and thus it is apparent from FIG. 2 that the behavioral object B contains the read/write (2) and the record arrangement (2). The start of the method M is instructed for the behavioral object B, that is, the read/write (2) and the record arrangement (2) (step S14). With this operation, programs which are written in the read/write (2) and the record arrangement (2) are executed (step S15), and records of variable length are arranged in the page which is managed by the page (2).

The above description on the operation relates to the case where the entity object O is the page (2), and the same operation is performed for the other entity objects (other pages and transactions).

In addition, the operation of the transactions (1) to (3) will be described.

It is now assumed that the application program 12 indicates a transaction as the entity object O and the method of the lock (1) is started as the behavioral object therefor. The transaction means an assembly in a read/write operation on page basis as described above, and the work allotment is set between the transaction and the page, so that the transaction is operated in association with a page which is also specified as an entity object together with the transaction. For example, when the method of the page (2) is started on the basis of the instruction from the application program 12 to read and write the content of an specified specific page for the record arrangement, the transaction (1) is specified as the entity object at the same time to start the method thereof (the lock (1) as the behavioral object), whereby the read/write operation of the specific page is collectively performed as a series of processing. For the series of processing on a page basis, the transaction (1) makes the first and last declarations to output a command for lock processing so that the read/write operation of the specific page is completed as a series of processing.

Figure 4:
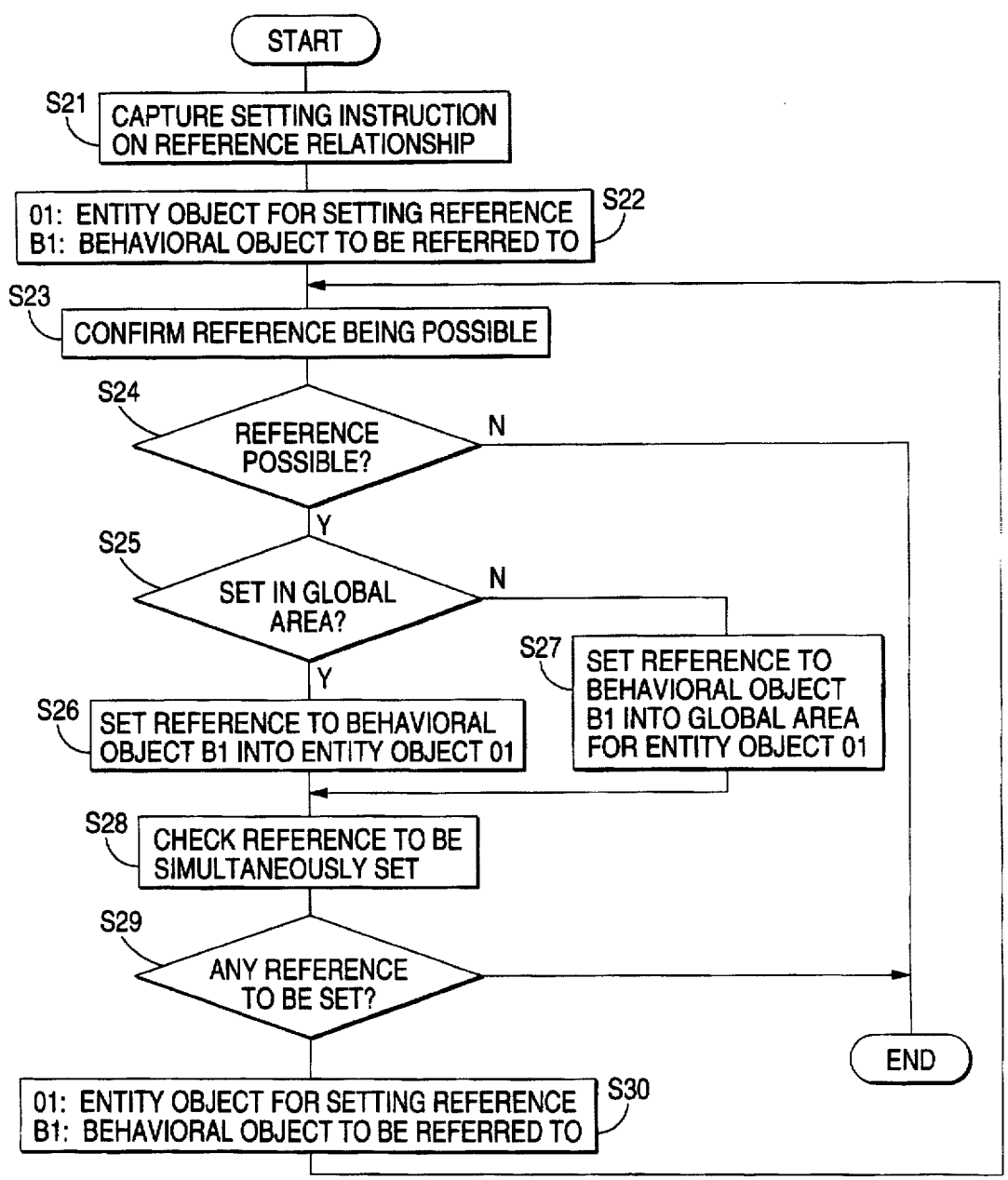
FIG. 4 is a flowchart for a reference relationship setting (or altering) process.
Figure 5:
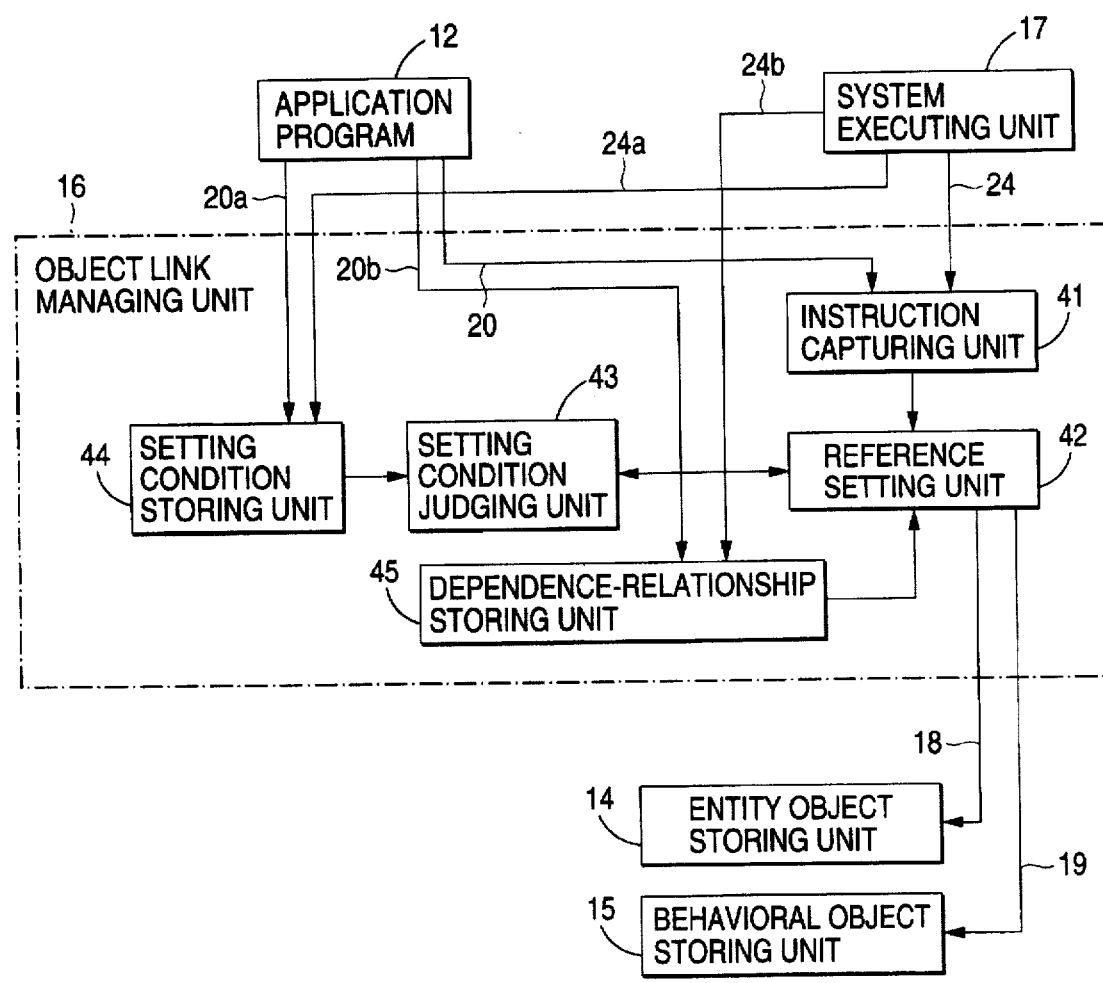
FIG. 5 is a block diagram showing an embodiment of an object link managing unit.

Next, the second operation, that is, the reference setting operation of the object link managing unit 16 on the basis of the setting instruction of the application program 12 (or system executing unit 17) will be described with reference to the flowchart of FIG. 4. For the description on this operation, it is preferable to clarify the detailed construction of the object link managing unit 16, and thus the second operation will be also described while referring to FIG. 5 showing an example of the internal construction of the object link managing unit 16.

A setting instruction 20 which is supplied from the application program 12 to the object link managing unit 16 is captured by an instruction capturing unit 41 (step S21). A reference setting instruction is made by supplying respective pairs of entity objects and behavioral objects (i.e., the relation between each entity object and each behavioral object is specified by supplying the pair of the entity object and the behavioral object). The entity object serves as a setting origin (reference origin), and the behavioral object serves as a reference target (destination). The instruction capturing unit 41 which captures a setting instruction on the reference relationship substitutes a pointer to the entity object of the setting origin into a variable O1, and also substitutes a pointer to the behavioral object of the reference target into a variable B1 (step S22). Hereinafter, the entity object set in the variable O1 is referred to as "entity object O1" and the behavioral object set in the variable B1 is referred to as "behavioral object B1".

Subsequently, a reference setting unit 42 supplies a setting condition judging unit 43 with the reference from the entity object O1 to the behavioral object B1 (i.e., the reference relation between the objects O1 and B1) which is captured by the instruction capturing unit 41, and asks the setting condition judging unit 43 as to whether this reference relation can be set or not (step S23).

A setting condition storing unit 44 beforehand stores setting conditions on the basis of a parameter of each entity object and each behavioral object according to "if-then" rule. The setting condition storing unit 44 judges it on the basis of the setting conditions stored in the setting condition storing units 44 whether it is possible to establish (set) the reference relation for the entity object O1 and the behavioral object B1 supplied from the reference setting unit 42 (step S24). The judgment result is given to the reference setting unit 42.

If the establishment is judged to be impossible, the reference setting unit 42 finishes the reference processing. On the other hand, if the establishment is judged to be possible, the reference setting unit 42 executes a next step S25. In step S25, it is judged for establishment of the reference relationship whether the pointer to the behavioral object B1 should be set in a storage area at the inside of the entity object O1 (hereinafter referred to as "internal storage area") or in a storage area (global variable) at the outside thereof (hereinafter referred to as "external storage area"). If the pointer is judged to be set in the internal storage area in step S25, the pointer to the behavioral object B1 is set into the internal storage area of the entity object O1 (step S26). On the other hand, if the pointer is judged to be set in the external storage area (global variable), the pointer to the behavioral object B1 is set in the external storage area of the entity object O1 (step S27).

A next step S28 is another processing which is executed in the reference setting unit 42. In step S28, the other entity objects and behavioral objects for which references should be set simultaneously with the establishment of the reference relation between the entity object 01 and the behavioral object B1 are checked using dependence-relationships which are stored in a dependence-relationship storing unit 45. The dependence-relationship storing unit 45 stores, in a dictionary style, values corresponding to respective pairs which comprise pointers to the other entity objects to be set and pointers to the other behavioral objects to be set (or pointers to procedures to generate the behavioral objects) while using, as indexes, addresses of the storage area in which the reference relationship is stored.

In step S29, if there exist no other entity objects and behavioral objects for which references are set, the processing is finished. On the other hand, if there exist those objects, the program goes to step S30. In step S30, like the step S22 as described above, the steps S23 to S27 are repeated for a new entity object and a new behavioral object using the variable 01 and the variable B1 again to set a reference relation between the entity object 01 and the behavioral B1. The steps S28 to S30 and the steps S23 to S27 are repeated if occasion demands.

In the processing at the steps S28 to S30 which is executed in the reference setting unit 42, the object link managing unit 16 itself sets and indicates the reference relationship between other entity objects and behavioral objects which are related to the reference relationship specified by the application program 12. This processing is automatically performed without intention at the application program side.

In some cases, the object link managing unit 16 itself automatically sets (alter) the reference from an entity object to a behavioral object dependently on an execution environment of the application program using the reference setting unit 42. The following cases may be considered as a case where the setting (alteration) of the reference relationship is dependent on the execution environment: when the system is started, when the application program (user) is in a privileged state, when the system is crowded, etc.

The reference relationship which is set in the reference setting unit 42 is set and held between the entity objects in the entity object storing unit 14 and the behavioral objects in the behavioral object storing unit 15 on the basis of the instructions 18 and 19.

In the operation as described above, the references (reference relationship) are set on the basis of the setting instruction supplied from the application program 12 to the instruction capturing unit 41. However, the reference setting may be performed on the basis of a reference setting instruction from the system executing unit 17. As shown in FIG. 5, the reference setting instruction 24 form the system executing unit 17 is also supplied to the instruction capturing unit 41 of the object link managing unit 16. The reference setting instruction (containing an alteration instruction) 24 is output from the system executing unit 17 when processing to be executed is urgent. As the urgent case may be considered a case where data processing must be performed within a predetermined time, for example, when the processing is real-time processing, when the system must be urgently stopped due to some trouble or the like.

The storage content of the setting condition storing unit 44 and the storage content of the dependence-relationship storing unit 45 may be altered on the basis of instructions 20a, 20b, 24a and 24b from the application program 12 or the system executing unit 17.

According to the flowchart of FIG. 5, the same operation can be executed for the alteration processing (which is equivalent to "re-setting") of the reference relationship which has been already set by merely replacing "reference setting" with "alteration of reference" in the flowchart. Through the reference alteration processing, renewed reference relationship is overwritten on a portion where old reference relationship has been stored.

As described above, in the data management system of this embodiment, the entity object and the behavioral object are separately and independently treated, and both the objects are freely related to each other through the reference relationship as described with reference to FIGS. 1 and 2. Furthermore, as is apparent from the description on the operation with FIG. 4, the reference from the entity object to the behavioral object can be freely set (or alter) at the application program (12) side or the system executing unit (17) side. Therefore, the degree of freedom in construction of the data management system can be improved, and in terms of the application program side, the data management system can be organized so that the most efficient data processing can be performed for the application program side.

When a reference setting (altering) instruction is supplied from the application program 12 (or system executing unit 17) to the object link managing unit 16, other relational references to be set (or altered) are automatically checked by the reference setting unit 42 in the object link managing unit 16, and these references are set (or altered) at the same time if necessary. Accordingly, the operational performance of the data management system is improved.

Figure 6:
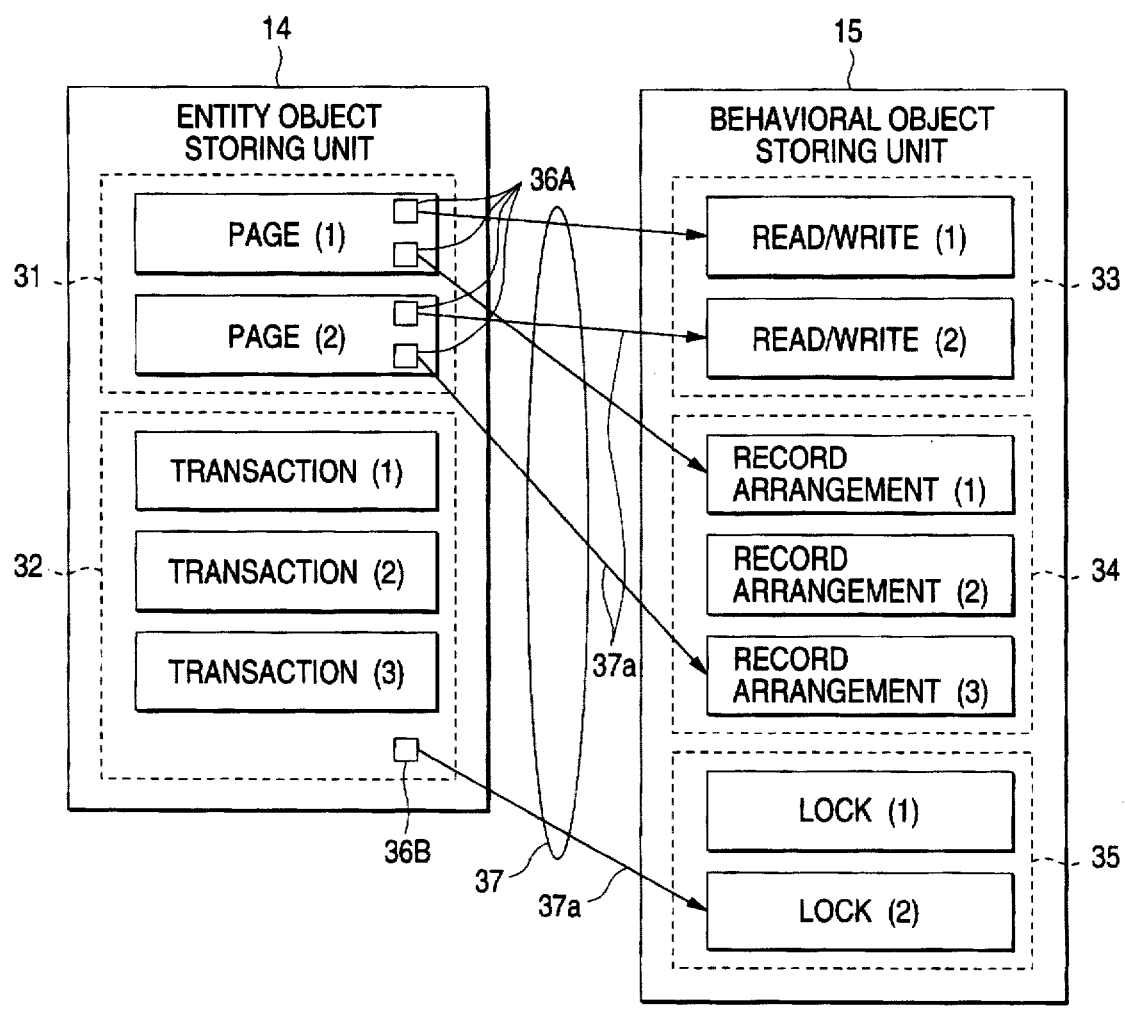
FIG. 6 is a diagram showing the internal construction of the entity object storage unit and the behavioral object storage unit to additionally register a behavioral object.

Next, the additive registration of a new behavioral object by the application program 12 will be described with reference to FIG. 6. In the following embodiment, a behavioral object in which the processing for another record arrangement is defined, that is, a record arrangement (3) is registered and some of the references are altered in the internal construction of each of the entity object storing unit 14 and the behavioral object storing unit 15 shown in FIG. 2. In FIG. 6, the substantially same elements as shown in FIG. 2 are represented by the same reference numerals.

The additive registration of the record arrangement (3) is performed by supplying a register instruction 22 (see FIG. 1) from the application program 12 to the behavioral object storing unit 15. In the record arrangement (3), a processing procedure of arranging the predetermined number of records each having a predetermined size is defined to perform the record arrangement efficiently.

As compared between the construction shown in FIG. 2 and the construction shown in FIG. 6, the different points are as follows: the record arrangement (3) is additionally registered in the behavioral object storing unit 15, and some of the references from the entity objects to the behavioral objects are altered on the basis of the reference altering instruction from the application program 12 as described above and the processing operation of the object link managing unit 16. In the embodiment shown in FIG. 7, the reference from the page (2) to the record arrangement (2) is altered to a reference from the page (2) to the record arrangement (3), and the reference from the common storage area 36B of the transactions (1) to (3) to the lock (1) is altered to a reference from the common storage area 36B to the lock (2). The reference relationship 37 shown in FIG. 6 is managed in the object link managing unit 16.

Next, an operation when an instruction on start of a method for record arrangement is supplied from the application program 12 to the page (2) in the state shown in FIG. 6 will be described. The process flow of this operation is identical to that of the flowchart of FIG. 3.

The page (2) is specified as an entity object, and a method is started for the page (2). For the start of the method, the system executing unit 17 indicates the record arrangement (3) to which the page (2) refers, as a behavioral object to execute the method. Subsequently, the method for the record arrangement (3) is started to execute the processing procedure defined in the method. With this operation, the predetermined number of records each having a predetermined size are arranged in a page managed by the page (2).

As described with reference to FIG. 6, the additive registration on the content of the behavioral object stored in the behavioral object is performed on the basis of the instruction 22 from the application program 12. Likewise, alteration (containing "deletion") can be performed on the content of the behavioral object. Furthermore, the additive registration or alteration can be performed on the content of the entity object stored in the entity object storing unit 14 on the basis of the instruction 21 from the application program.

As described above, entity objects or behavioral objects can be given or deleted by the application program, so that the processing for a data operation which is inherent to each application program can be performed most efficiently.

The embodiment as described above is described using the concept of object-orientation such as entity objects, behavioral objects, etc. That is, it is described above that the entity object selects a behavioral object serving as a processing program through the reference relationship therebetween. However, the present invention is not limited to this construction. For example, the present invention may be applied to another construction that a program for performing processing concerned is selected through data (having a reference function such as a pointer or the like) corresponding to an entity object on the basis of some instruction.

According to the data management system of the present invention, a conventional object comprising data and an operation therefor is divided into an entity object and a behavioral object, and these objects are separately stored in different storage units which are exclusively used for the respective objects. Both the objects are related to each other through a reference from the entity object to the behavioral object. Such a reference is set with a combination of higher degree of freedom, and the reference is freely altered after set. Accordingly, the content of the entity object, the content of the behavioral object and the reference relationship between the entity object and the behavioral object can be freely set and altered in the data management system. Furthermore, the construction and operation of the data management system can be dynamically altered in accordance with the amount and size of data to be operated and the frequency of the operation in a state where the application program operates, so that the data operation can be performed with high efficiency.

Furthermore, according to the data management system of the present invention, the reference from the entity object to the behavioral object can be set (or altered) on the basis of the setting instruction from the application program, so that the processing of the data operation inherent to the application program can be performed with high efficiency.

What is claimed is:

1. In a computer having a data management system, a method for managing data stored in a storage device, comprising:

storing behavioral objects defining processing procedures;

storing entity objects separately from the behavioral objects, each of the entity objects referring to at least one of the behavioral objects;

receiving setting instructions defining reference relationships between the entity objects and the behavioral objects;

setting the reference relationships based on the setting instructions;

managing the reference relationships; and executing a processing procedure defined in a behavioral object referred to by an entity object.

2. The method of claim 1, wherein the data management system is coupled to an application program, and wherein the step of receiving includes receiving the setting instructions from the coupled application program.

3. A data management system for managing data stored in a storage device, comprising:

first storing means for storing behavioral objects defining processing procedures;

second storing means for separately storing entity objects, each of the entity objects referring to at least one of the behavioral objects;

object link managing means, configured to receive setting instructions defining the reference relationships between the entity objects and the behavioral objects, for setting the reference relationships between each of the entity objects and associated ones of the behavioral objects on the basis of the setting instructions, and managing the reference relationships; and executing means for executing a processing procedure defined in a behavioral object referred to by an entity object.

4. The data management system of claim 3, wherein the data management system is coupled to an application program, and wherein the object linking means includes
    means for receiving setting instructions from the application program.

* * * * *